(12) United States Patent
Grossi et al.

(10) Patent No.: US 12,516,756 B2
(45) Date of Patent: Jan. 6, 2026

(54) VISIBILITY ENHANCING STRUCTURE FOR CORRUGATED HOSES, CABLES, AND SCUFF COVERS

(71) Applicant: Salem-Republic Rubber Company, Sebring, OH (US)

(72) Inventors: James P. Grossi, Malvern, OH (US); Jesse L. Shreve, Carrollton, OH (US); Sarah Holt, Sebring, OH (US)

(73) Assignee: SALEM-REPUBLIC RUBBER COMPANY, Sebring, OH (US)

( * ) Notice: Subject to any disclaimer, the term of this patent is extended or adjusted under 35 U.S.C. 154(b) by 501 days.

(21) Appl. No.: 18/084,636

(22) Filed: Dec. 20, 2022

(65) Prior Publication Data

US 2024/0200695 A1 Jun. 20, 2024

(51) Int. Cl.
*F16L 11/12* (2006.01)

(52) U.S. Cl.
CPC .................. *F16L 11/124* (2013.01)

(58) Field of Classification Search
CPC .................................................. F16L 11/124
See application file for complete search history.

(56) References Cited

U.S. PATENT DOCUMENTS

| | | | |
|---|---|---|---|
| 3,834,423 A * | 9/1974 | Elson | F16L 11/24 138/122 |
| 4,098,298 A * | 7/1978 | Vohrer | F16L 11/112 138/132 |
| 4,258,755 A * | 3/1981 | Higbee | F16L 11/08 138/104 |
| 5,129,429 A * | 7/1992 | Winter | F16L 11/115 138/132 |
| 5,226,456 A * | 7/1993 | Semak | F16L 3/26 248/75 |
| 5,350,885 A * | 9/1994 | Falciglia | H02G 3/0462 174/109 |
| 6,079,135 A | 6/2000 | Ruiz | |
| 6,308,741 B1 | 10/2001 | Payne | |
| 6,367,510 B1 * | 4/2002 | Carlson | F16L 11/118 138/121 |
| 6,742,545 B2 | 6/2004 | Fisher et al. | |
| 6,827,109 B2 | 12/2004 | McCaughtry | |
| 6,969,804 B2 | 11/2005 | Payne | |
| 6,983,767 B2 | 1/2006 | Rickards | |
| 9,539,449 B2 | 1/2017 | Richardson | |
| 2003/0178083 A1* | 9/2003 | McCaughtry | F16L 11/112 138/121 |
| 2004/0103949 A1* | 6/2004 | Rickards | F16L 57/00 138/158 |
| 2004/0200536 A1 | 10/2004 | Strasser et al. | |
| 2013/0048133 A1 | 2/2013 | Richardson | |

(Continued)

*Primary Examiner* — David R Deal
(74) *Attorney, Agent, or Firm* — Buckingham, Doolittle & Burroughs, LLC; Dominic Frisina (57) ABSTRACT

A visibility-enhanced corrugated structure is provided. The structure includes a base tube having an internal passage that slideably receives an inner element such as a hose, cable or fluid. A rub strip is provided on crests of the corrugated structure to mitigate abrasion wear of structures located beneath the crests. One or more visibility strips are provided within the corrugations in a flank or root region, thus protecting the visibility strip from wear. Suitable visibility strips may be reflective or phosphorescent.

10 Claims, 12 Drawing Sheets

(56) References Cited

U.S. PATENT DOCUMENTS

2014/0231103 A1* 8/2014 Savage ................ F16L 11/124
                                                    29/428
2015/0125637 A1* 5/2015 Bacon ................. H01B 13/342
                                                    138/104
2015/0129075 A1  5/2015 Walsh
2022/0290783 A1  9/2022 De Carlo

* cited by examiner

VISIBILITY ENHANCING STRUCTURE FOR CORRUGATED HOSES, CABLES, AND SCUFF COVERS

I. BACKGROUND OF THE INVENTION

A. Field of Invention

The present invention relates to the field visibility enhanced corrugated structures such as, without limitation, gas turbine engine starter hoses, scuff covers for such hoses and for electrical cables, as well as corrugated hoses or tubes.

B. Description of the Related Art

When a jet airplane is parked at a gate of an airport, the jet's engines are turned off, and the jet needs an external source of electrical power. Therefore, an electrical cable is plugged into the jet to supply electric power temporarily. The electrical cable is kept at a storage location near the gate when not in use. The electrical cable is pulled over from the storage location and connected to the jet. As the electrical cable is pulled over to the jet, the cable, which is heavy, drags along the ground surface and can wear. The heavy cable also can be difficult to pull along the ground.

Similarly, to start the jet's engines, a jet starter hose is plugged into the engine. The jet starter hose directs compressed air at a high flow rate against the turbine blades of the engine to start the engine. The jet starter hose, like the electrical cable, is heavy and is dragged along the ground surface to connect with the airplane.

It is typical to use a device called a "scuff cover" in this circumstance. The scuff cover is an outer tubular member enclosing the cable or hose. The inside diameter of the scuff cover is larger than the outside diameter of the cable or hose, so that the two can move independently of each other to bend and be coiled. The scuff cover has an outer surface that contacts the ground surface as the cable or hose is being dragged to the jet or to the storage location. Thus, the scuff cover takes any wear, rather than the functional cable or hose.

It is desirable that the scuff cover move along the ground surface as easily as possible, that is, with low friction. One known scuff cover includes an outer wrap of ultrahigh molecular weight polyethylene. This plastic material is wrapped over the entire outer surface of the scuff cover. This material exhibits a low coefficient of friction. The wrapping of the entire outer surface of the scuff cover, however, makes the scuff cover quite heavy and very stiff, both of which are undesirable qualities.

Another known scuff cover comprises a nylon mesh tube having a rub strip, or wear strip, on its outer surface. The rub strip is formed on the outer surface in a helical configuration. The rub strip covers only a percentage of the outer surface of the tube. The rub strip is made from rubber, however, resulting in a large amount of friction and substantial abrasion as the scuff cover is dragged along the ground surface.

Known scuff covers tend to be difficult to see on a tarmac. For example, a black rubber scuff cover and tends to blend in with black asphalt. As a result, scuff covers are prone to damage on a busy tarmac by being run over by service vehicles, and are similarly prone to causing accidents, especially when visibility conditions are compromised, such as at night or in stormy weather. Similar problems exist with other similar corrugated tube structures that may be used in dark or dimly lit areas where poor visibility is a hazard.

Some embodiments of the present invention may provide one or more benefits or advantages over the prior art.

II. SUMMARY OF THE INVENTION

Embodiments of the invention comprise a visibility-enhanced corrugated structure such as a scuff cover for jet starter hoses, electrical cables, and hoses for carrying various liquids and gases. Embodiments include a pattern of crests and roots connected by flanks. The crests are equipped with plastic materials such as ultra high molecular weight polyethylene, which resists abrasive wear better than the underlying rubber and/or fabric. This creates a natural recess that protects a visibility enhancing structure, referred to herein as a visibility strip. The visibility strip may be reflective or emissive, or both, and makes the embodiment more easy to see in low-light conditions, or any conditions where visibility is impaired e.g., by smoke or rain. The visibility strip is embedded in the outer surface of the embodiment in a helical pattern or circular pattern, so that the structure is visible from all angles in any orientation.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figures 1, 2:
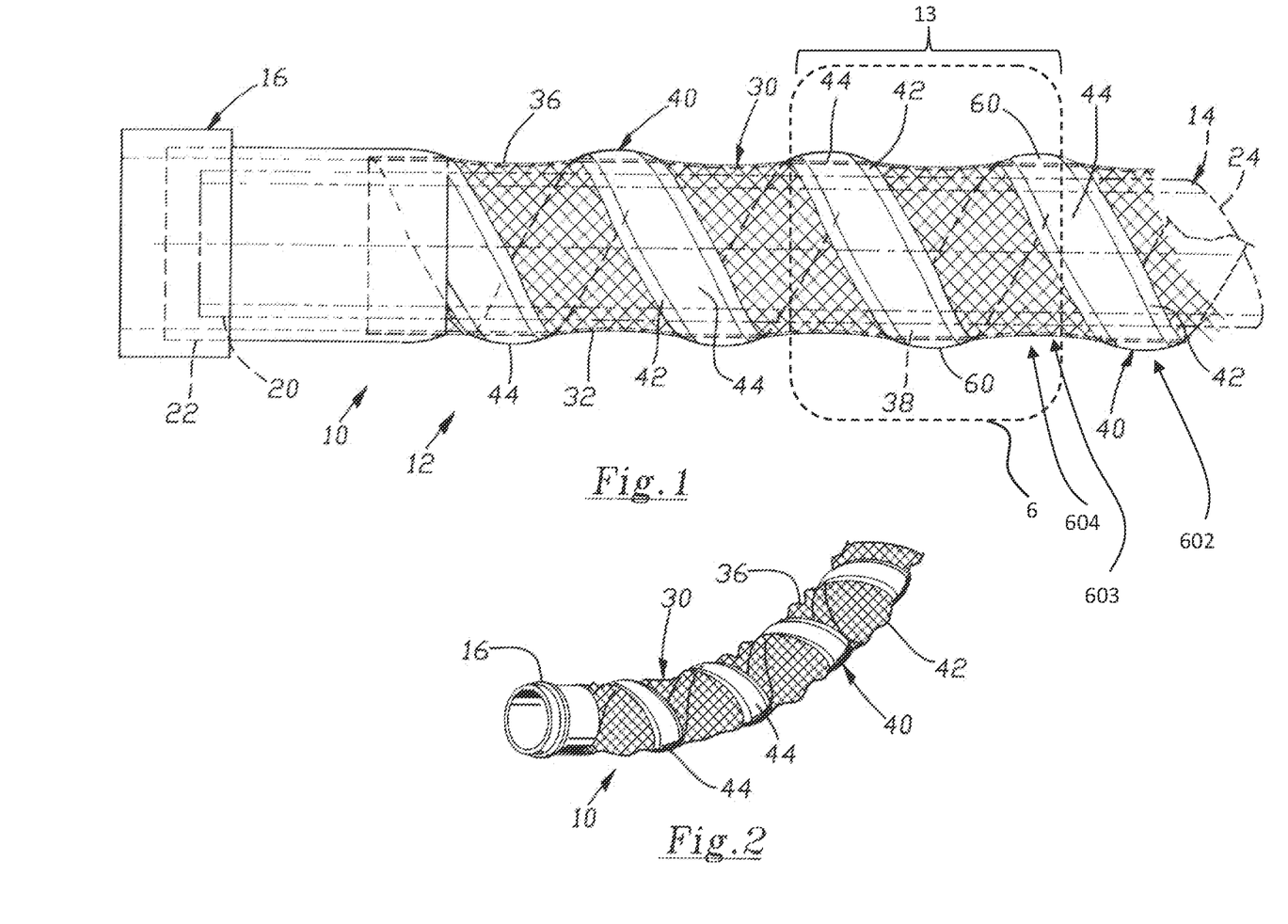
FIG. 1 is a side sectional view of a portion of a first scuff cover.
FIG. 2 is a view of the scuff cover of FIG. 1 in a bent or curved configuration.

Referring now to the drawings wherein the showings are for purposes of illustrating embodiments of the invention only and not for purposes of limiting the same, FIG. 1 is a portion of a scuff cover 10 for a jet starter hose. The scuff cover 10, described below in detail, is part of a hose assembly shown partially at 12. The hose assembly 12 includes, in addition to the scuff cover 10, a jet starter hose 14 and a coupling 16. The starter hose 14 extends through the scuff cover 10. An end portion 20 of the starter hose 14 is fixed to an end portion 22 of the scuff cover 10 by the coupling 16.

The hose assembly 12 is used in starting the engines of a jet airplane (not shown). When a jet airplane is parked at a gate of an airport, the jet's engines are turned off. To start the jet's engines, the coupling 16 of the hose assembly 12 is connected with the engine. The starter hose 14 has an internal passage 24 through which hot, compressed air is directed, at a high flow rate, against the turbine blades of the jet engine. The flow of air starts the engine running.

Figure 3:
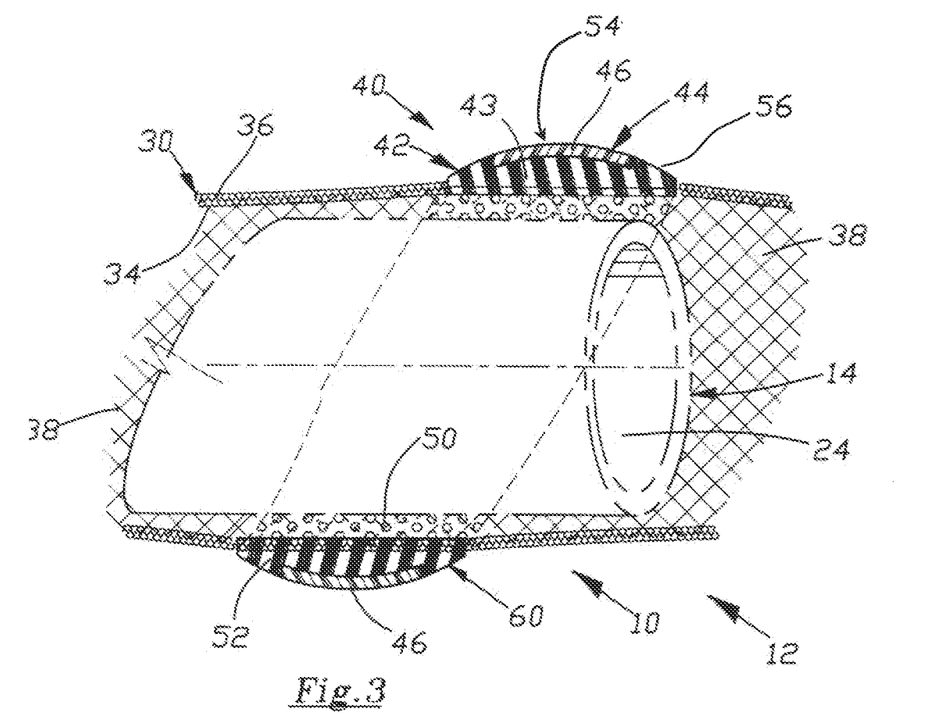
FIG. 3 is a sectional view through the scuff cover of FIG. 1.

The scuff cover 10 illustrated in FIGS. 1-3 includes a base tube 30. The material of the base tube 30 is selected for its light weight, flexibility, durability, and strength. In the illustrated embodiment, the base tube is made from a nylon mesh material 32, preferably Dacron.

The base tube 30 has a generally cylindrical cross-sectional configuration. The diameter of the base tube 30 may vary depending on the amount by which the base tube is stretched. With particular reference to FIG. 3, the base tube 30 has opposite inner and outer surfaces 34 and 36. The inner surface 34 of the scuff cover defines a central opening 38 in the scuff cover 10. The starter hose 14 is received in and extends longitudinally through the central opening 38 in the scuff cover 10.

The scuff cover 10 also includes one or more wear strips, or rub strips, 40. In the illustrated embodiment, the scuff cover 10 includes a single rub strip 40 formed in a helical configuration on the outer surface 36 of the base tube 30. Other scuff covers in accordance with the invention may have more than one rub strip. Additionally, a scuff cover in accordance with the invention may have one or more rub strips formed in a configuration other than helical, such as a circular or hoop configuration.

The rub strip 40 includes two layers, or portions, of material. A first portion 42 of the rub strip 40 is made from rubber or a rubber-like material 43. A preferred material is a compound whose major polymer is typically SBR or EPDM, for example. This material 43 has the characteristics of flowability under heat, the ability to bond with the material of the base tube 30, and strength.

A second layer, or portion, 44 of the rub strip 40 is made from a plastic material 46. This material 46 has the characteristics of relatively light weight (as compared to the rubber first layer 42), durability when moved across a surface such as concrete or asphalt, and a low coefficient of friction. A preferred material is ultrahigh molecular weight polyethylene.

Figure 6A:
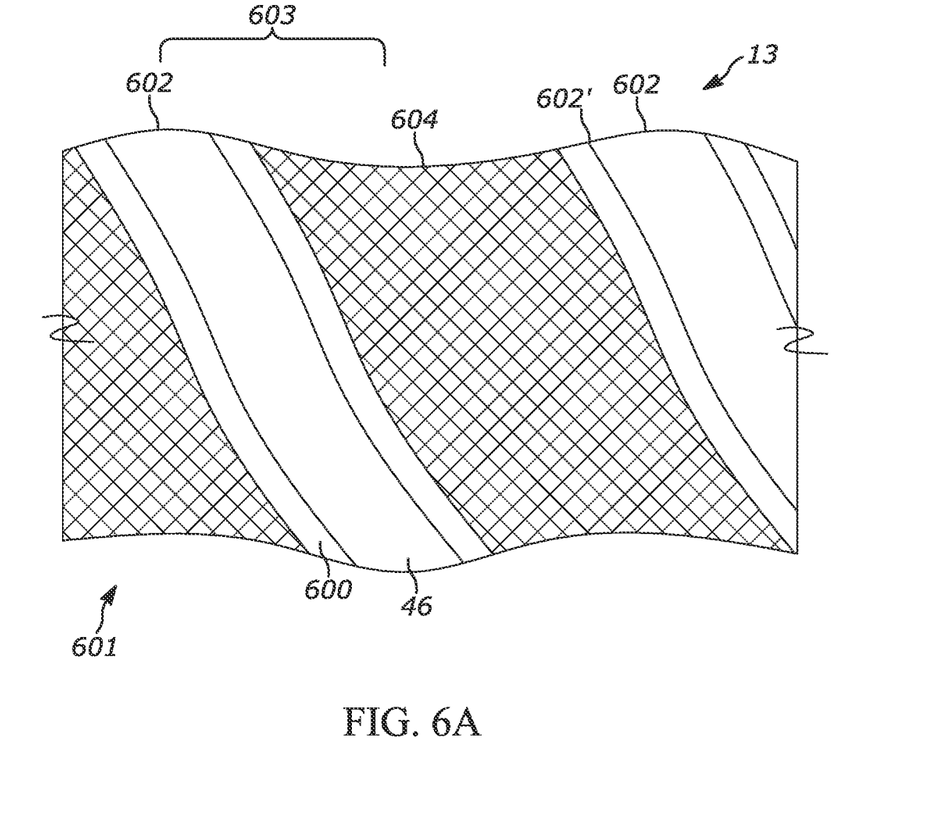
FIG. 6A is similar to the embodiment shown in FIG. 1, but further includes a visibility strip.
Figure 6B:
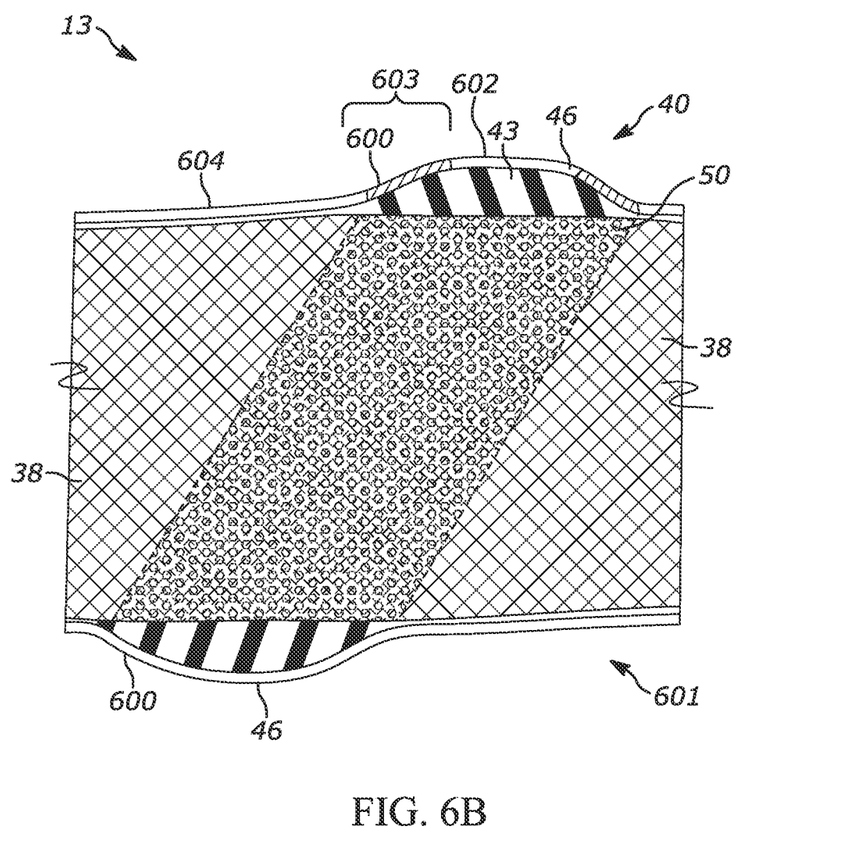
FIG. 6B is a sectional view of the embodiment shown in FIG. 6A.

The rub strip 40 cooperates with the base tube 30 to define a corrugated surface 13 of crests 602 and roots 604, as shown in FIGS. 1 and 6. Box 6 in FIG. 1 shows a structure that is analogous to, but not identical to, the embodiment of FIG. 6. The main difference between the embodiments is that the "rubber first layer 42" of FIG. 1 is overlaid by visibility strip 600 in FIG. 6. As used herein, the crests 602 are the outermost radial position and the roots 604 are the innermost radial position, which are connected by flanks 603. The flanks 603 and roots 604 are naturally protected from scuffing due to being recessed relative to the crests 602. Thus, these areas 603, 604 are particularly suitable for placing a visibility strip 600 inasmuch as the protection that they offer tends to preserve the functionality of the visibility strip 600. The person having ordinary skill in the art will understand that scuffing a reflective surface tends to diminish its efficacy. Similarly, scuffing phosphorescent surface tends to remove the phosphor. Accordingly, both kinds of visibility strips benefit form being located in a recessed position.

A visibility strip 600 is bonded to a portion of a flank 603, which may or may not include the root 604, to enhance visibility of the hose or tube to which it is attached. A visibility strip reflects light or emits light e.g., through phosphorescence. Suitable visibility strips 600 are flexible so that they bend and move with the hose. A wide variety of visibility strips 600 are known in the art, and the invention is not limited to a particular kind; however, for purposes of illustration, suitable visibility strips 600 can comprise known reflective strip materials such as high index glass bead (HIGB) reflective strips. HIGB reflectors comprise a metalized resin base film layer. High index glass beads are embedded in the metalized surface, and then coated with a transparent resin layer. Light transmitted through the bead is reflected by the metalized layer back through the bead. The glass beads' refractivity combined with the irregular reflective metalized surface causes reflected light intensity to vary with respect to position, producing regions of high intensity, which an observer perceives as a glittering effect. The person having ordinary skill in the art will be aware that this is merely one example of reflective materials that may serve as visibility strips. The invention is intended to encompass any reflective material with adequate mechanical strength and flexibility, and the capacity for bonding to the corrugated hose, cable, or scuff cover, as describe elsewhere herein. For example, suitable visibility strips can comprise flexible polymer films, flexible fabric webs, metalized plastic films, or multilayered combinations thereof.

Visibility strips 600 can comprise light emitting materials instead of, or in addition to, reflective materials. Well-known phosphorescent materials include strontium aluminate ($SrAl_2O_4:Eu^{2+}$) and copper activated zinc sulfide, which are commercially available in various strip forms such as adhesive and non-adhesive vinyl tapes. Similar to reflective strips, the invention is intended to encompass any known phosphorescent material having a persistent glow visible to the naked eye for a timescale of hours, and having adequate mechanical strength and flexibility, and the capacity for bonding to the corrugated hose, cable, or scuff cover, as describe elsewhere herein.

According to embodiments of the invention, an internal passage 24 is adapted to slidably receive an inner element. As used here, the term slideably receive means that the inner element is unrestricted in axial movement within the internal passage 24. The inner element is not required to make continuous contact with the internal passage or be restricted only to axial movement. For example, an electrical cable or a jet starter hose 14 are examples of inner elements of a scuff cover. A jet starter hose 14 inner element is illustrated in FIG. 3. Generally, such inner elements are anchored to one or both ends of the scuff cover. In embodiments comprising hoses for transferring gases or liquids, the inner element is the gas or liquid passing through the hose. Thus, the person having ordinary skill in the art will understand that the meaning of slideably receive depends on the particular embodiment. The physical structure referred to by the term "adapted to" slideably receive, is therefore the space provided by the internal passage.

Manufacturing Scuff Cover Embodiments

A scuff cover 10 embodiment is manufactured as follows. A cylindrical steel pole (not shown), or similar form, is provided. The pole has an outside diameter equal to the desired finished inside diameter of the scuff cover 10.

A single strip of the mesh material 32 of the base tube 30 of the scuff cover 40 is wrapped around the pole in a helical configuration, starting at one end and extending along the length of the pole. The mesh material 32 is wrapped around the pole so that the edge of one layer is overlapped by the edge of the next succeeding layer. Thus, the entire surface of the selected length of the pole is covered with the single strip of mesh material 32. The edge of the wrap forms a seam. The seam extends in a helical configuration along the length of the mesh material 32.

Next, a single strip of the rubber material 43 is wrapped around the pole in a helical configuration, starting at one end and extending along the length of the pole. The rubber material 43 is wrapped around the pole so that the rubber portion overlies, or covers, the seam formed by the mesh strip 32. This rubber material 43 will form the first portion 42 of the rub strip 40.

Next, a single strip of the ultrahigh molecular weight polyethylene plastic material 46 is wrapped around the pole in a helical configuration, starting at one end and extending along the length of the pole. The polyethylene material 46 is wrapped so that it overlies, or covers, the central portion of the rubber portion material 43 of the rub strip 40. This polyethylene material 46 forms the second portion 44 of the rub strip 40.

Figure 7:
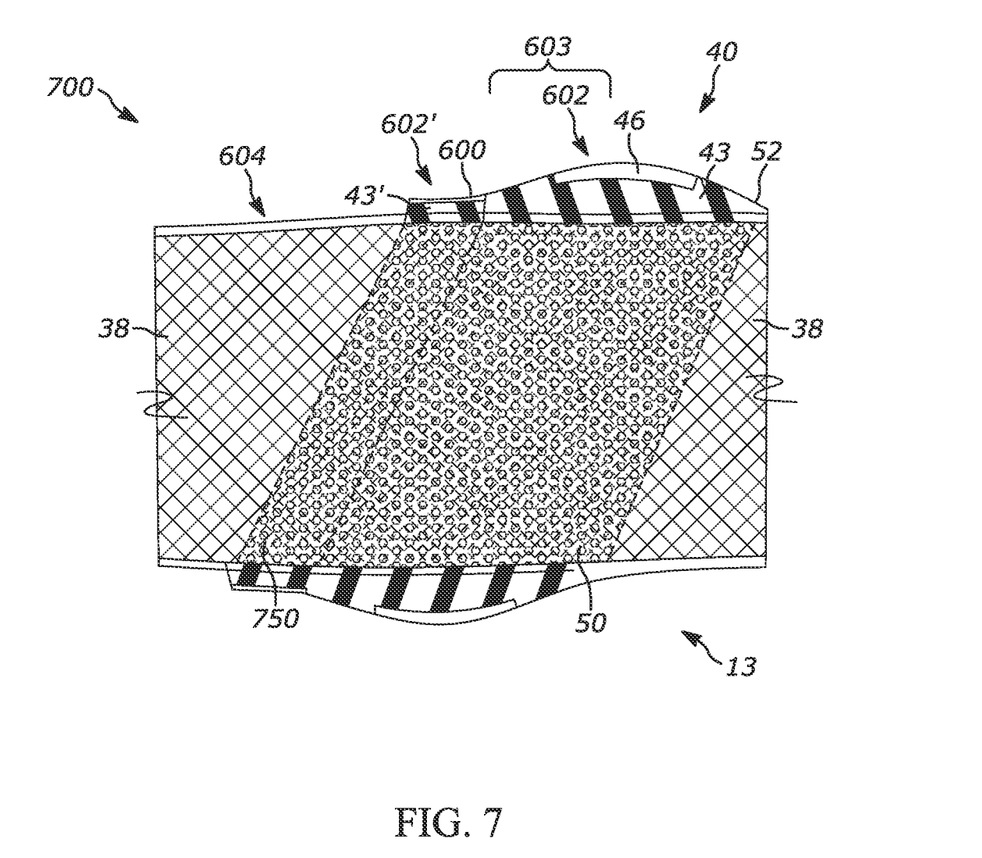
FIG. 7 is a sectional view of an embodiment similar to that of FIG. 6A be the visibility strip being adjacent to the rub strip.
Figure 8:
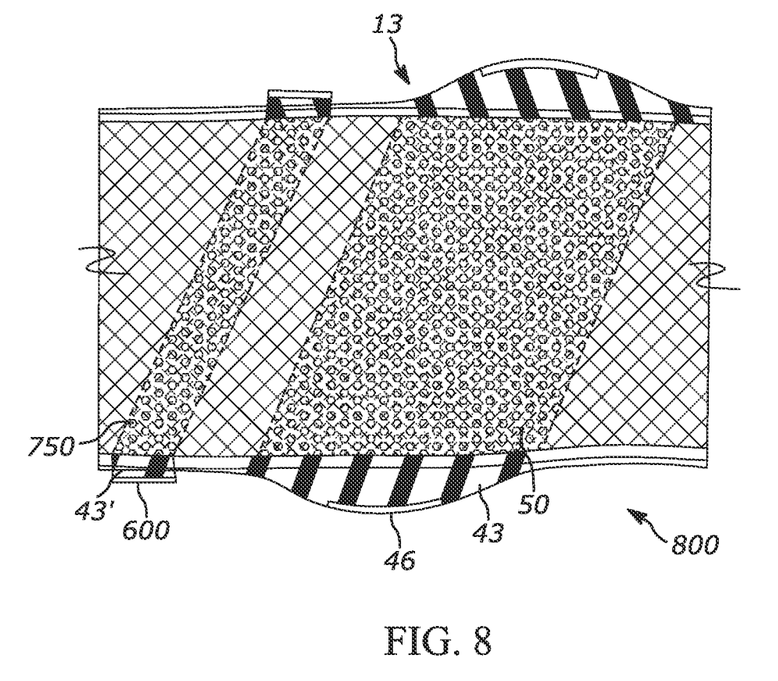
FIG. 8 is a sectional view of an embodiment similar to that of FIG. 6A be the visibility strip being spaced apart from the rub strip.

As shown in FIG. 6, a visibility strip 600 is wrapped around the pole parallel to the plastic material 46, in a helical configuration starting at one end and extending along the length of the pole. The visibility strip 600 can be wrapped according to one of three general patterns. In a first pattern, shown in FIG. 6, the visibility strip 600 is positioned in the flank region 603 adjacent to one or, as shown in FIG. 6, both sides of the plastic material 46. With the plastic material occupying a crest position of the tube, the visibility strip 600 is disposed in the upper flank 603 region between the crests 602. Though not a requirement of the invention, one advantage of placing the visibility strip 600 on both flanks 603 of a crest 602 is that one strip 600 faces generally toward the fore of the embodiment while the other faces generally toward the aft of the embodiment, together enhancing visibility of the hose in both directions. Alternatively, the visibility strip 600 may be positioned adjacent to the rub strip 40 as shown in FIG. 7 or even in the root 604 as shown in FIG. 8. In such embodiments, the visibility strip is coated on one side with rubber or a rubber-like material similar to structure 43.

Then, a nylon overwrap (not shown) is placed on the entire outer surface of the scuff cover 10 as thus partially assembled. The scuff cover 10 and nylon overwrap are then placed into an autoclave or similar mechanism and subjected to heat, steam, and pressure. The heat softens the rubber material 43 of the first portion 42 of the rub strip 40. Similarly, in embodiments such as those shown in FIGS. 7 and 8, the rubber material 43' coated on a visibility strip 600 is softened.

One part 50 of the rubber material 43 and 43' flows into the interstices of the mesh material 32, to form a physical bond between the rubber material and the mesh material. Another part 52 of the rubber material 43 remains on top of the outer surface 36 of the mesh material 32. This part 52 of the rubber material 43 projects radially outward of the outer surface 36 of the mesh material 32. The plastic material 46, at this time, also is disposed radially outward of the outer surface 36 of the mesh material 32.

In the autoclave, the nylon overwrap shrinks radially inward by about three percent. Thus, as the rubber material 43 softens, the plastic strip 46 is forced radially inward into the rubber material 43 until it is embedded in the rubber material. Upon embedding, the outer surface 54 of the plastic strip 46 is flush with the outer surface 56 of the rubber material 43.

The scuff cover 10 and nylon overwrap are then removed from the autoclave and allowed to cool. The nylon overwrap is removed, and the scuff cover 10 has the finished configuration shown in the drawings.

The rub strip 40 as thus formed has a portion 60 that projects radially outward from the outer surface 36 of the base tube 30. The radially projecting portion 60 of the rub strip 40 includes the second part 52 of the rubber material 43. The radially projecting portion 60 of the rub strip 30 also includes the plastic material 46. The plastic material 46 is disposed radially outward of the outer surface 36 of the base tube 30.

With reference to FIGS. 7 and 8, in embodiments where the visibility strip 600 is bonded through a rubber material 43' separate and spaced apart from that of the rub strip 40, the visibility strip 600 projects radially outward from the rubber material 43'. However, the visibility strip 600 is limited in height in that it crests 602' at a radial position below the crest 602 of the rub strip 40. As used here, the term "crest" is used to indicate an outermost radial position of a given structure, and does not limit the invention to particular visibility strips having a convex surface.

The plastic material 46 is the radially outermost surface of the rub strip 40, and forms an outer layer of the rub strip 40. The rubber portion 42 of the rub strip 40 forms an inner layer of the rub strip.

The scuff cover 10 of the present invention is advantageous in that the plastic material 46 forms the radially outermost portion of the scuff cover. The plastic material 46 has a relatively low coefficient of friction as compared to the rubber portion 42, and so moves easily along a surface such as the ground surface adjacent a jet airplane. Therefore, the scuff cover 10 can be dragged relatively easily along such a surface. As compared to the rubber 42, which catches on the ground surface, the plastic 46 tends to skip across the ground surface.

In addition, the plastic material 46 is highly resistant to abrasion, as compared to rubber or rubber-like materials. Specifically, tests show that the plastic material 46 is eleven times more abrasion resistant than the rubber material 43, and thus more durable. Therefore, the scuff cover 10 exhibits relatively low wear in use.

The rub strip 40 preferably covers from about 10% to about 50% of the outer surface 36 of the base tube 30. A preferred percentage of coverage is about 35%. Because the rub strip 40 covers only a relatively small percentage of the outer surface 36 of the scuff cover 10, the amount of added weight is minimized. Also, the scuff cover 10 remains quite flexible even as compared to a similar scuff cover not having a rub strip. FIG. 2 shows the scuff cover 10 in a partially coiled configuration, for example; the scuff cover, with the elongate inner member inside it, would often be coiled for storage.

Figure 4:
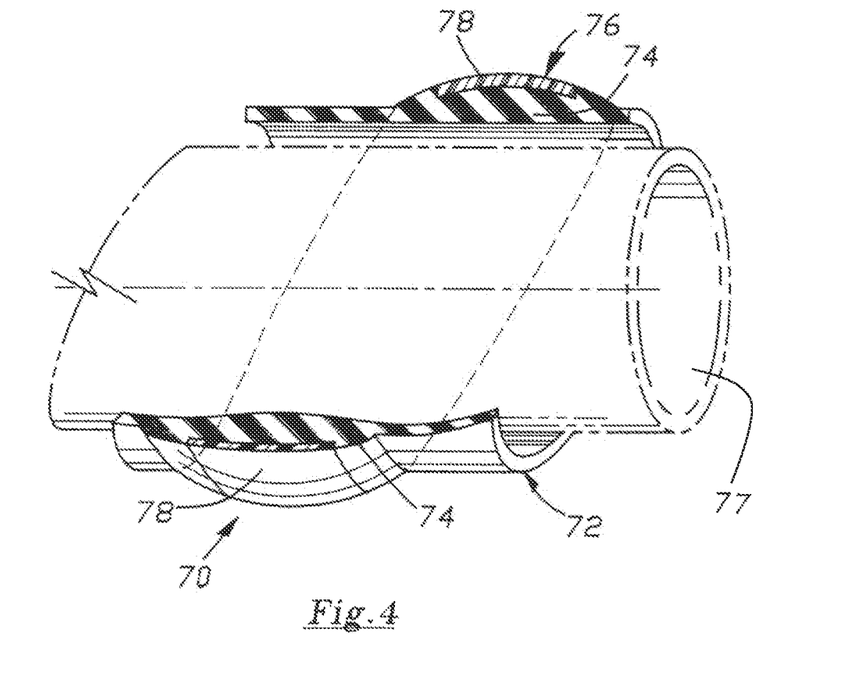
FIG. 4 is a sectional view, similar to FIG. 3, of a second scuff cover.

FIG. 4 illustrates a portion of a scuff cover 70 constructed in accordance with a second embodiment of the invention. The scuff cover 70 is generally similar in construction to the scuff cover 10 (FIGS. 1-3). In the second embodiment, however, the base tube is formed from the same material as the first part 42 (the rubber part) of the rub strip 40.

Specifically, FIG. 4 illustrates a scuff cover 70 that includes a solid (not perforate, as in the first embodiment) base tube 72 formed from a rubber or rubber-like material. The first portion 74 of the rub strip 76 is formed as one piece with the base tube 72, for example, by molding. The second portion or outer layer 78 of the rub strip 76, the plastic part, is made from the same material as the second portion or outer layer 44 of the rub strip 40 in the first embodiment. The plastic material 78 is the radially outermost surface of the rub strip 76 and of the scuff cover 70, and forms an outer layer of the rub strip.

Figure 9A:
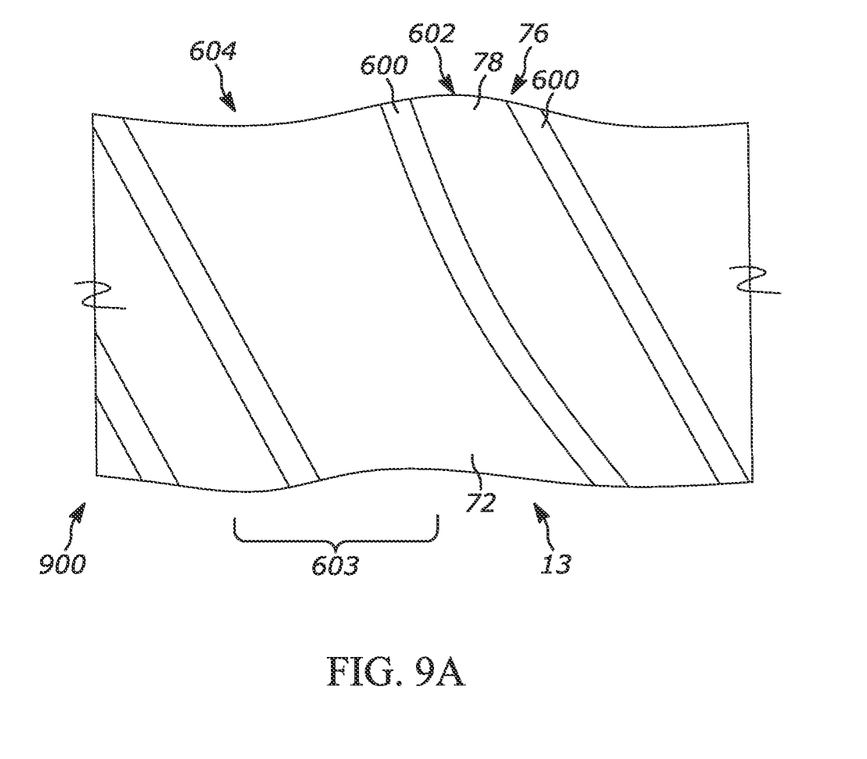
FIG. 9A is a side view of an embodiment similar to FIG. 4 but further including visibility strips on the rub strip.
Figure 9B:
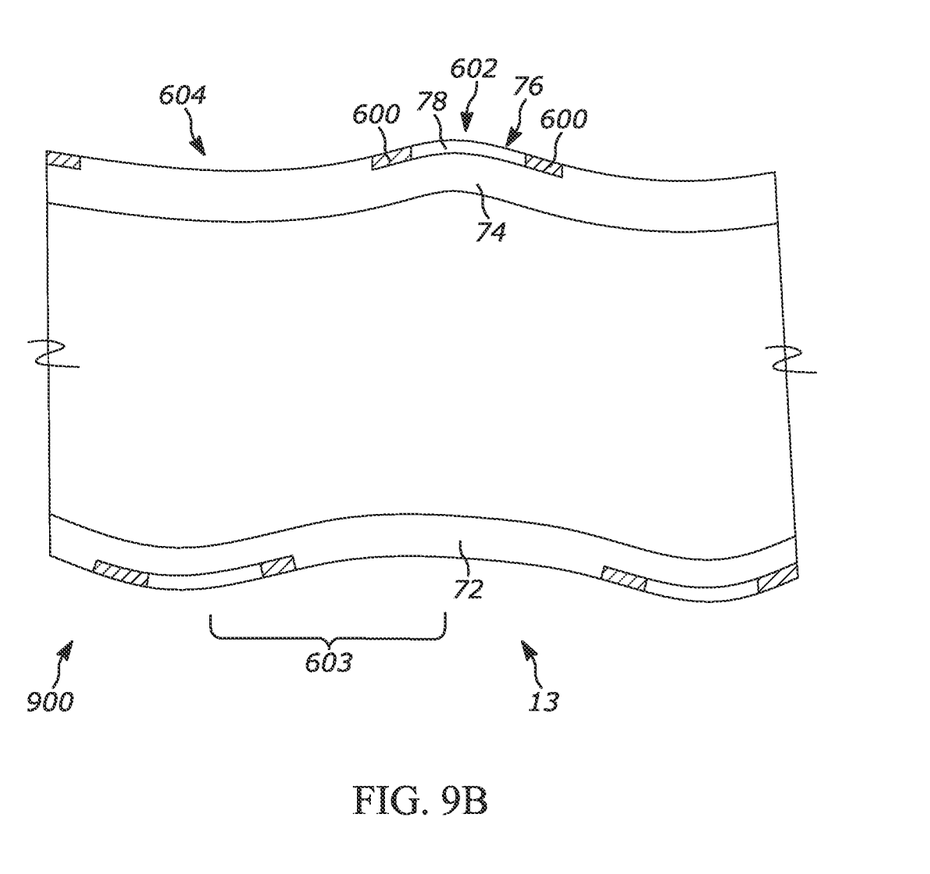
FIG. 9B is a sectional view of the embodiment of FIG. 9A.
Figure 9C:
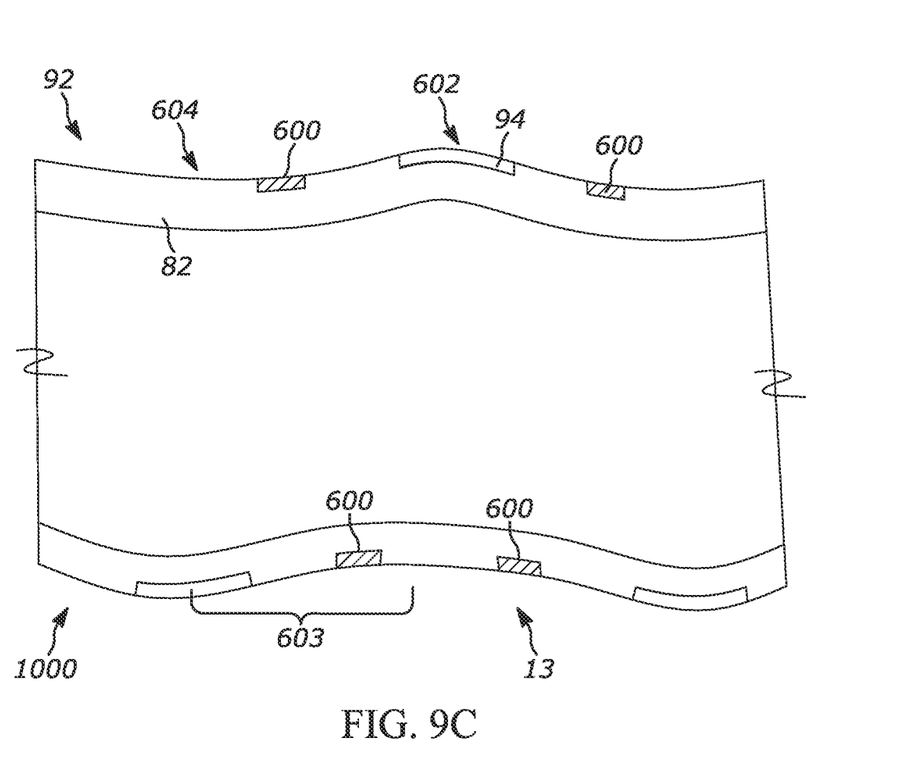
FIG. 9C is a sectional view of an embodiment similar to FIG. 9B but further including visibility strips spaced apart from the rub strip.

FIGS. 9A-9C illustrate embodiments 900, 1000 similar to that of FIG. 4 but further including a visibility strip 600. In FIG. 9A the visibility strip flanks both sides of the plastic material 78 and is located in the flank region 603 of the embodiment 900. That is to say, the visibility strip is located in the region between the crest 602 and the root 604. Like the plastic material 78 of the rub strip 76, the visibility strip is formed embedded in the rub strip 76 under heat and radially applied pressure. FIG. 9B illustrates the same embodiment 900 as FIG. 9A but provides a sectional view showing the visibility strip 600 and plastic material 78 embedded in the base tube 72. FIG. 9C shows a similar embodiment 1000, but the visibility strips are located in the flank region 603 near the root 604. In both embodiments 900, 1000 the visibility strip 600 crests at a radial position below that of the plastic material 78. Accordingly, the plastic material 78 will wear preferentially, and the visibility strip will be protected.

The scuff cover 70 is thus illustrative of a scuff cover in which the base tube is formed as one piece with a portion of the rub strip. Such a scuff cover 70 could be used to protect a separate internal hose 77 as shown in FIG. 4. Such a scuff cover 70 could alternatively be used, for example, to carry fluids such as gas or liquid directly, that is, without a separate internal hose.

Figure 5:
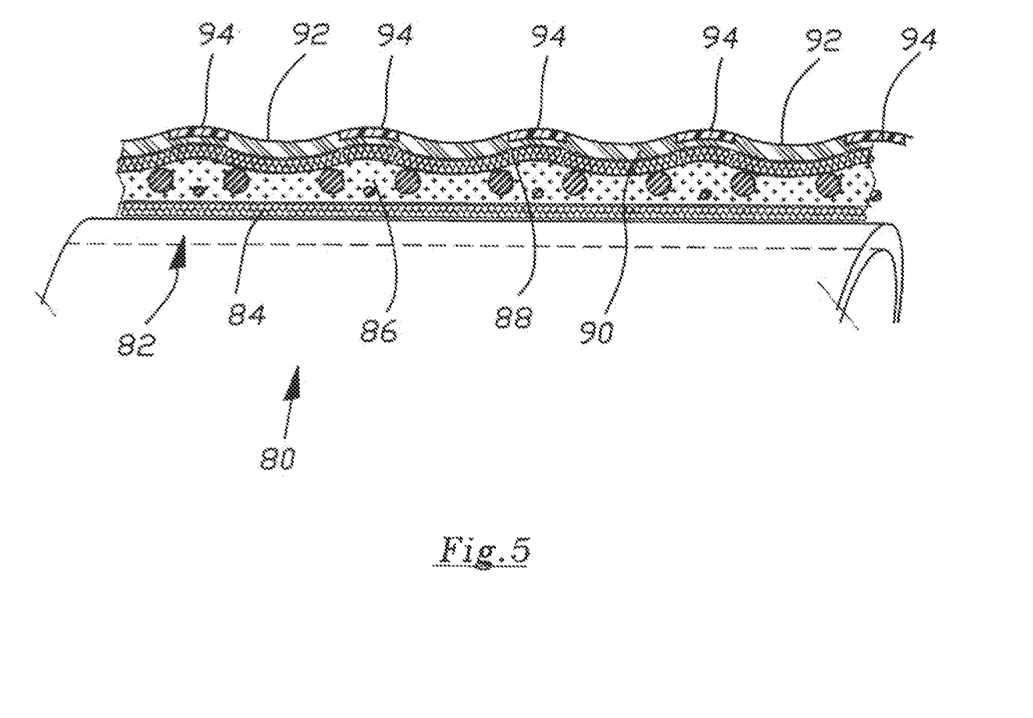
FIG. 5 is a sectional view of a third scuff cover.
Figure 10:
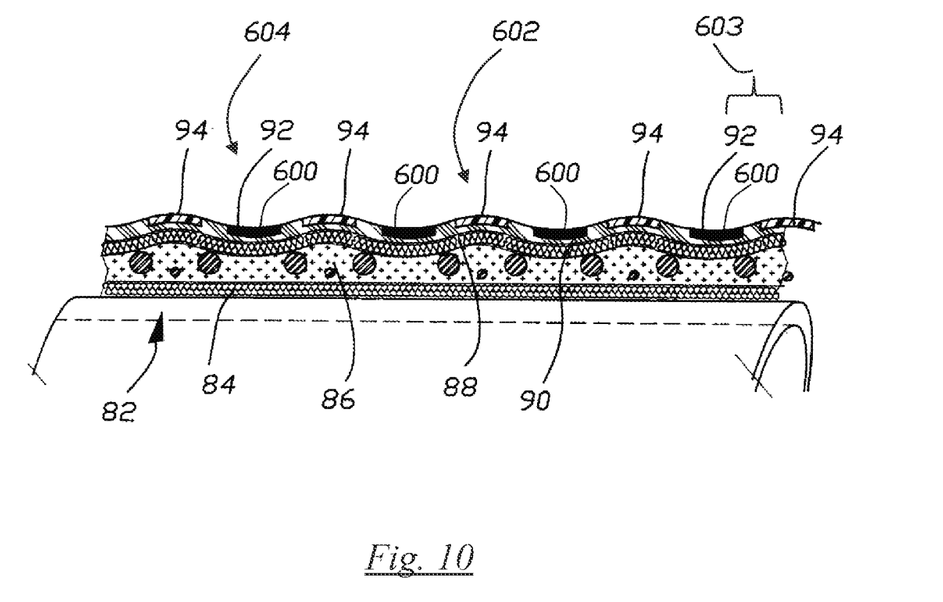
FIG. 10 is a sectional view of an embodiment similar to that of FIG. 5, but further including a visibility strip.

FIG. 5 illustrates a portion of a scuff cover 80 constructed in accordance with a third embodiment of the invention. The scuff cover 80 comprises a base tube 82 of a construction generally known, including a plurality of layers 84, 86, 88 and 90 of material formed with a helically configured outer surface 92. A strip 94 of ultrahigh molecular weight polyethylene is embedded in the outer layer 90, at the outmost raised helical portions of the surface 92. The strip 94 forms the radially outermost surface of the scuff cover 80. FIG. 10 illustrates an embodiment similar to that of FIG. 5 but further including a visibility strip located in the root 604 region of the corrugated surface. Like other embodiments herein, the embodiments shown in FIGS. 5 and 10 can include helical or circular rub strips and visibility strip.

Figure 11:
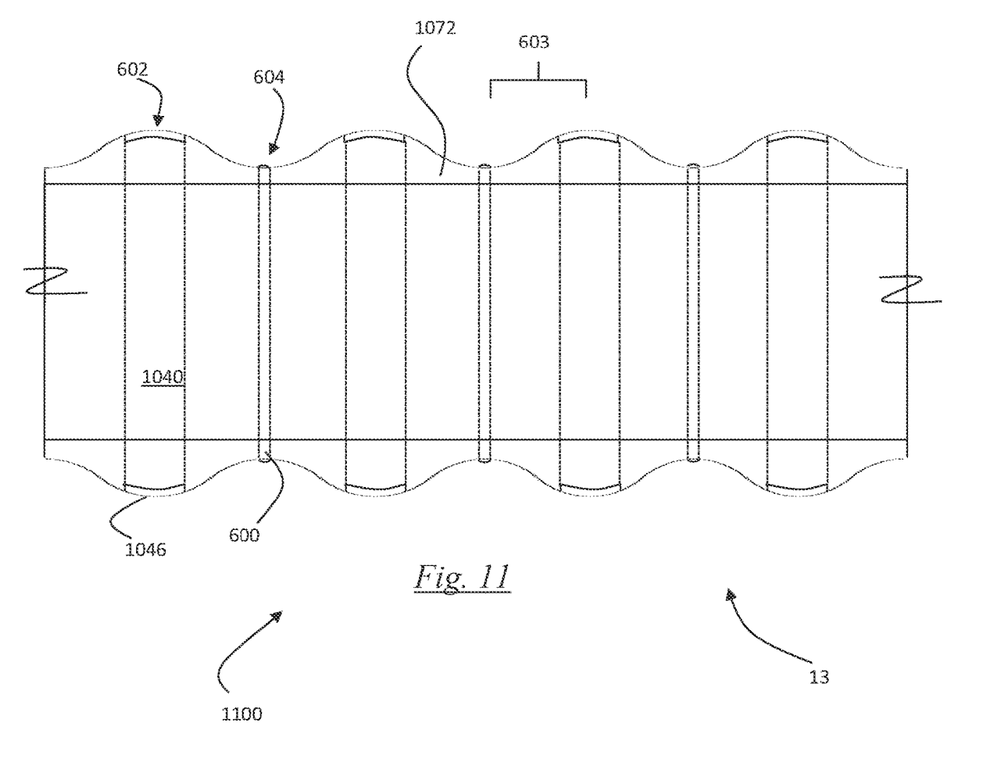
FIG. 11 is a sectional view of an embodiment where the visibility strips are rings rather than helices.

The embodiment 1100 of FIG. 11 shows rub strips 1040 having plastic material 1046 arranged in a ring or circular configuration rather than helical. Similarly, the visibility strips 600 are also circular rather than helical. The plastic material 1046 occupies the crest region 602 of the present embodiment 1100 while the visibility strip occupies the root region 604. Of course, since both structures have a non-zero width, they both also occupy a portion of the flanks 603 in the vicinity of the crests 602 and roots 604.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed:

What is claimed is:

1. A visibility enhanced corrugated structure, comprising:
   a flexible base tube having an inner surface defining an internal passage adapted to slideably receive an inner element, and the base tube also having an outer surface;
   a rub strip projecting from the outer surface of the base tube, wherein the rub strip is comprised of rubber;
   a corrugated outer surface of the visibility enhanced corrugated structure, comprising: a repeating pattern of an outermost crest, a first flank extending from the crest to an innermost root, and a second flank extending from the innermost root to a second crest;
   a visibility strip covering at least a portion of the first flank, the visibility strip extending radially outward to a radial position lower than that of the outermost crest; and
   a rubber coating on one side of the visibility strip, wherein the rubber coating bonds the visibility strip to the rub strip.

2. The visibility enhanced corrugated structure of claim 1, wherein the rub strip extends helically around the base tube, and wherein the visibility strip substantially covers the first flank.

3. The visibility enhanced corrugated structure of claim 2, wherein the visibility strip substantially covers the first flank and the root.

4. The visibility enhanced corrugated structure of claim 3, wherein the visibility strip substantially covers the first flank, the root, and the second flank.

5. The visibility enhanced corrugated structure of claim 1, wherein the rub strip extends circumferentially around the base tube, and wherein the visibility strip substantially covers the first flank.

6. The visibility enhanced corrugated structure of claim 5, wherein the visibility strip substantially covers the first flank and the root.

7. The visibility enhanced corrugated structure of claim 1, wherein the visibility strip comprises a reflector.

8. The visibility enhanced corrugated structure of claim 1, wherein the visibility strip comprises a phosphorescent material.

9. The visibility enhanced corrugated structure of claim 8, wherein the phosphorescent material is selected from one or more of strontium aluminate or zinc sulfide.

10. The visibility enhanced corrugated structure of claim 1, wherein the visibility strip is embedded in the base tube.

\* \* \* \* \*